United States Patent [19]

Frost

[11] 3,956,136
[45] May 11, 1976

[54] NITROGEN LINKED CYCLIC POLYETHER ION BINDING POLYMERIC LIQUID PURIFICATION MATERIALS

[75] Inventor: Lawrence W. Frost, Murrysville, Pa.

[73] Assignee: Union Carbide Corporation, New York, N.Y.

[22] Filed: Jan. 3, 1974

[21] Appl. No.: 430,452

[52] U.S. Cl............................................. 210/500 M
[51] Int. Cl.².................................... B01D 31/00
[58] Field of Search........... 260/78 TF, 2.5, 33.2 EP, 260/47 CP; 55/16, 158; 264/41, 49; 210/22, 23, 321, 433, 490, 500

[56] References Cited
UNITED STATES PATENTS

| | | | |
|---|---|---|---|
| 3,179,631 | 4/1965 | Endrey............................ | 260/78 TF |
| 3,179,632 | 4/1965 | Hendrix.......................... | 260/78 TF |
| 3,179,633 | 4/1965 | Endrey............................ | 260/78 TF |
| 3,179,634 | 4/1965 | Edwards.......................... | 260/78 TF |
| 3,719,640 | 3/1973 | Lee et al. ....................... | 210/500 M |
| 3,816,303 | 6/1974 | Wrasidlo ..................... | 210/500 M X |
| 3,817,386 | 6/1974 | Frost et al. ................. | 210/500 M X |

*Primary Examiner*—Frank A. Spear, Jr.
*Attorney, Agent, or Firm*—William R. Moran

[57] ABSTRACT

A hydrophilic permselective polymeric material for use in a liquid purification system comprises nitrogen linked cyclic polyether divalent radical constituents.

9 Claims, 2 Drawing Figures

NITROGEN LINKED CYCLIC POLYETHER ION BINDING POLYMERIC LIQUID PURIFICATION MATERIALS

BACKGROUND OF THE INVENTION

This invention relates to polymers comprising nitrogen linked macrocyclic polyether cation binding divalent radical constituents, and specifically to supported permselective membranes made from such polymers and used in reverse osmosis systems. C. J. Pedersen, J. Amer. Chem. Soc., Vol. 89, P. 70717 (1967), herein incorporated by reference, described the synthesis of cation binding macrocyclic polyethers. They were found to strongly increase the solubility of inorganic salts in organic solvents.

Kopolow, Esch and Smid, Macromolecules, Vol. 4,359 (1971) and Vol. 6, P.133 (1973) described the polymerization of macrocyclic polyethers by straight chain hydrocarbon linking of vinyl monomers, and complexing of cations within or between the macrocyclic polyether moieties. These polymerized cyclic-polyethers have been used as transport compounds for the study of cation movement across biological cell membranes. The lipid portions of cell membranes represent an extremely high polar barrier for passage of Na or K ions. The cyclic polyethers bind the ion within their structure and can easily transport the ion past the lipid polar head groups of the cell which contact an aqueous medium.

Feigenbaum and Michel, J. Polymer Science, Vol. 9, P 817 (1971) cast polyamide films formed from the reaction product of diamino-2,3,11,12-dibenzo-1,4,7,10,13,16-hexaoxacyclooctadeca-2,11-diene (diamino dibenzo-18-crown-6) and isophthaloyl chloride. They determined which of the alkali metal and alkali earth cations would complex within the macrocyclic polyether moieties of this particular polyamide film and also measured the tensile modulus, dielectric constant and resistivity of the films.

SUMMARY OF THE INVENTION

Applicants have provided hydrophilic, permselective, polymeric liquid purification membranes and materials comprising nitrogen linked cyclic polyether rings.

BRIEF DESCRIPTION OF THE DRAWINGS

For a better understanding of the invention, reference may be made to the preferred embodiments exemplary of the invention, shown in the accompanying drawings, in which.

DESCRIPTION OF THE PREFERRED EMBODIMENTS

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure is excess of this osmotic pressure difference is applied to the more concentrated solution, then the solvent can be caused to flow into the more dilute solution. The names "reverse osmosis", "pressure osmosis" and "hyperfiltration" are used to describe this process.

Figure 1:
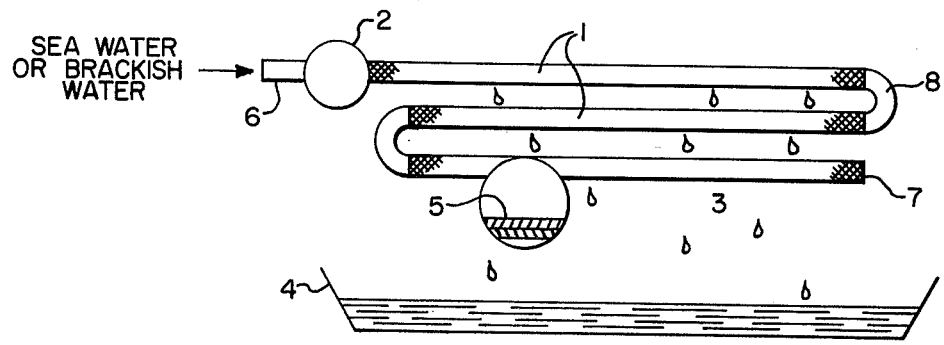
FIG. 1 is a diagram showing the principle for extracting fresh water from sea or contaminated water by a reverse osmosis liquid treatment system containing a supported membrane, feed inlet means and treated liquid outlet means.

The drawing of FIG. 1 illustrates a typical tubular-type reverse osmosis system. Sea water or contaminated water is pumped through a series of membrane support tubes 1. The pump 2 can operate the produce pressures as high as 4,000 psi. The tubes can be mounted in batteries of about 150 each. They serve to support the reverse osmosis membrane 5, as shown in the greatly enlarged cross-section, contained on the interior tube wall. The tube may be made of a variety of materials such as porous fiber glass or perforated stainless steel. The preferred porous tubular support module is made from epoxy or phenolic resin-bonded filler particles, such as sand, as described in U.S. Pat. No. 3,598,241, herein incorporated by reference. Of course, flat plate type reverse osmosis modules, which are well known in the art, can be used to support the membranes of this invention. The tube walls that support the reverse osmosis membranes must be able to withstand the pressure exerted on them by the pump and must be able to allow egress of the pure water 3 into a collecting pan 4. The reverse osmosis apparatus of this invention consists of at least one liquid purification module of resin bonded filler particles containing at least one and preferably a plurality of spaced apart feed bores extending axially from end to end therethrough, and our particular tubular reverse osmosis membranes contacting the support walls. For sea water several passes through a system of this type may be required before the water is usable. Also shown are feed inlet 6, feed outlet 7, and connecting endplates 8 having water channels.

Figure 2:
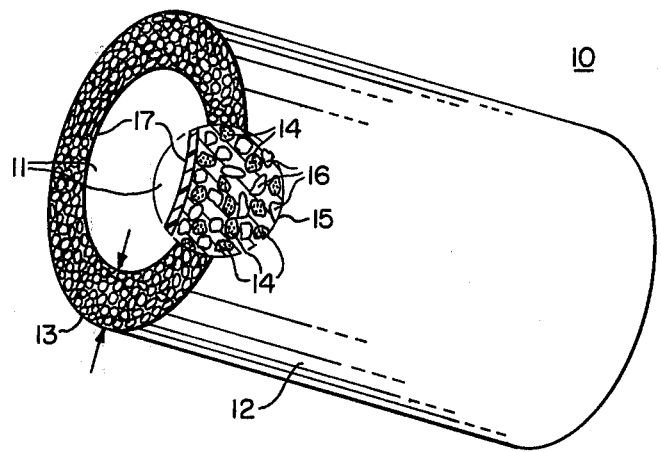
FIG. 2 is a three dimensional cross-sectional view of one embodiment of a reverse osmosis membrane support tube showing the membrane supported by the inside tube walls.

FIG. 2 shows the preferred reverse osmosis membrane support tube as 10, containing feed water passageway 11. The tube wall 12 of thickness 13 comprises bonded filler particles 14 coated with an organic resin film 15 which bonds the filler particles together. The tube 10 contains voids or pores 16 between the resin coated filler particles, allowing egress of the pure water which has passed through the reverse osmosis membrane 17 of this invention, supported by the inside of the tube walls. The area and number of the voids will vary inversely with the amount of resin and catalyst that is coated onto the filler particles. The resin which on curing bonds adjacent filler particles can be selected from the group consisting of epoxy resins, phenolic resins, polyester resins and melamine-formaldehyde resins. The filler particles may be spherical, oval or of irregular shape and can be sand, zircon, quartz or other granular material having an average particle size range between about 40 and 500 microns. Below 40 microns the resin-filler support tube lacks the desired porosity and above 500 microns the tube does not properly support the membrane. The weight percent of resin that can be used will vary from about 1 to 18 weight percent of the coated filler particle weight. Above 18 weight percent resin the pores will clog while below 1 weight percent resin the tube will be too weak to withstand the high pressure required in reverse osmosis application.

In general, the cyclic polyether (crown) constituent contained in the nitrogen-linked polymeric materials of this invention is a divalent organic radical having a ring structure of alternating oxygen atoms and organic radicals, in which the number of oxygen atoms is from about 3–20 and the total number of carbon plus oxygen atoms in the ring is from about 9–60. The organic radicals between the oxygen atoms in the ring have a valence of from 2–4, the total valence of all of these organic radicals being equal to two more than twice the number of the radicals. These two extra valences are the points of attachment to the nitrogen linked polymer chain. Both of them may be present on one tetravalent radical or one may be present on each of two trivalent radicals, the remaining radicals being divalent, for example:

$(-C_{10}H_{10}O_3-)$ and $(-C_{14}H_{10}O_4-)$ wherein —$C_{10}H_{10}O_3$— has three organic radicals, with 8 total valences and —$C_{14}H_{10}O_4$— has four organic radicals, with 10 total valences.

For convenience, the cyclic polyether diradical contained in the nitrogen-linked polymeric materials of this invention is designated as -[x-crown-y]-, in which x is the total number of carbon plus oxygen atoms making up the polyether ring, and y is the number of oxygen atoms in that ring. Thus x can vary from about 9–60 and y can vary from about 3–20. Using Pedersen nomenclature, —$C_{10}H_{10}O_3$— is a benzo-9-crown-3 radical, and —$C_{14}H_{10}O_4$— is a dibenzo —10— crown —4 radical.

The organic radicals in the polyether ring can be of several types. The divalent radicals in the polyether ring can be, for example, alkylene groups such as methylene —$CH_2$—, ethylene —$C_2H_4$—, isopropylidene $$-\overset{CH_3}{\underset{CH_3}{C}}-,$$

1,2 butylene $CH_3CH_2CHCH_2$, 1,3 butylene $CH_3CHCH_2CH_2$ or 1,4 butylene $CH_2CH_2CH_2CH_2$;

alicyclic groups such as cyclobutanedimethylene $-CH_2-CH\overset{CH_2}{\underset{CH_2}{\diagdown}}CHCH_2-,$ cyclohexadiyl $-CH\overset{CH_2CH_2}{\underset{CH_2CH_2}{\diagdown}}CH-$ or isopropylidenedicylohexadiyl; and aromatic groups such as phenylene, naphthylene, bisphenylene or phenylenedimethylene The trivalent and tetravalent radicals in the ring that attach the ring to the nitrogen linked polymer chain are of the same types but including respectively, one and two additional valences.

Preferred types of organic radicals in the cyclic polyether diradical -[x-crown-y]-are (1) those in which both trivalent radicals are the same and chosen from the group consistng of (a)

$-CH_2\overset{|}{C}H-,$ wherein x is 9–28 and y is 3–8, for example, 9-crown-3,12-crown-4,15-crown-5,18-crown-6,21-crown-7 and 24-crown-8 radicals, (b)

wherein x is 12–30 and y is 4–10, for example, dibenzo-12-crown-4, dibenzo-15-crown-5,dibenzo-18-crown-6,dibenzo-21-crown-7, dibenzo-24-crown-8,dibenzo-27-crown-9 and dibenzo-30-crown-10 radicals, and (c)

where S indicates a saturated ring, wherein x is 12–30 and y is 4–10, for example dicyclohexyl-12-crown-4,dicyclohexyl-15-crown-5,dicyclohexyl-18-crown-6,dicyclohexyl-21-crown-7,dicyclohexyl-24-crown-8,dicyclohexyl-27-crown-9 and dicyclohexyl-30-crown-10 radicals and (2) those in which the tetravalent radical is selected from the group consisting of (a)

(a) 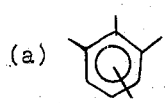 and , wherein $x$ is 9–18 and $y$ is 3–6, for example, benzo-9-crown-3, benzo-12-crown-4, benzo-15-crown-5 and benzo-18-crown-6 radicals, and (b) 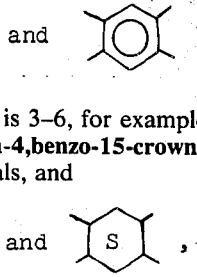

wherein $x$ is 9–18 and $y$ is 3–6, for example, cyclohexyl-9-crown-3, cyclohexyl-12-crown-4, cyclohexyl-15-crown-5 and cyclohexyl-18-crown-6 radicals.

The most preferred types of organic radicals in the cyclic polyether diradical -[$x$-crown-$y$]- are those in which the divalent radicals are ethylene groups and the radicals in the ring that attach the ring to the nitrogen linked polymer chain are trivalent radicals, wherein both trivalent radicals are the same and chosen from the group consisting of

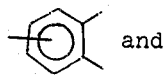 and 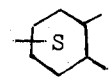

wherein $x$ is 15–21 and $y$ is 5–7, for example dibenzo-15-crown-5, dibenzo-18-crown-6, dibenzo-21-crown-7, dicyclohexyl-15-crown-5, dicyclohexyl-18-crown-6 and dicyclohexyl-21-crown-7.

In all cases, the polymeric material of this invention comprises nitrogen linked cyclic polyether rings, the cyclic polyether rings consisting of from 3-20 and preferably 4-10 oxygen atoms, and a total number of oxygen atoms plus carbon atoms of from 9-60 and preferably 12-30. Preferably the material is a polyamic acid linked cyclic polyether, a polyimide linked cyclic polyether or a polyamide-imide linked cyclic polyether.

The ion binding macrocyclic polyethers useful as the starting materials in forming the reverse osmosis membranes or other type liquid purification materials of this invention, can in one of their simplest forms have the chemical structure:

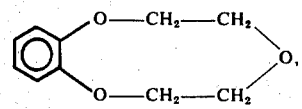

i.e., $\overline{C}_{10}H_{12}O_3$, 2,3-benzo-1,4,7-trioxacyclonona-2-ene; or using Pedersen nomenclature, wherein cyclic poly-ethers are, as a class, called "crown" compounds, benzo-9-crown-3. Others could include the structures:

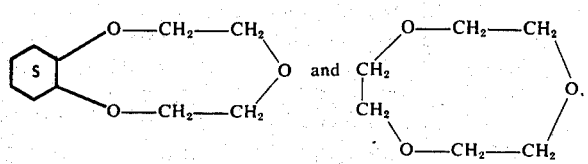

i.e., cyclohexyl-9-crown-3 and 9-crown-3 respectively, the first number referring to the ring size (6 carbons and 3 oxygen atoms) and the second to the number of oxygen atoms. Although unsubstituted crown polyethers, such as 18-crown-6 for example, and alicyclic substituted crown polyethers, such as cyclohexyl-15-crown-5 and dicyclohexyl-16-crown-6 for example, are useful, one benzene ring and preferably two can be present in the starting cyclic polyether. For example, dibenzo compounds, such as dibenzo-18-crown-6, which has the chemical structure:

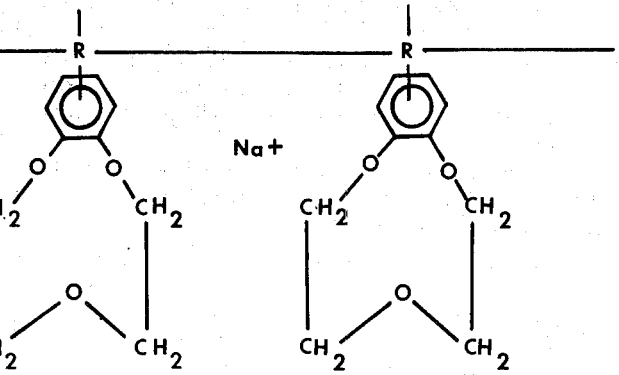

have been found to be particularly useful starting materials.

These crown cyclic polyethers form complexes with salts. The complexes are believed to be formed by ion-dipole interaction between a cation, such as Li+, Na+, K+, Mg++, Ba++, Ca++, or NH$_4$+ and the relative negative oxygen atoms symmetrically placed in the crown polyether ring. That is, the cation becomes electrically trapped within or between the crown rings, as shown below in simplified form, as described by Kopolow, Esch and Smid:

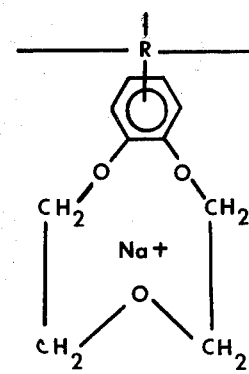

For reverse osmosis applications, the complexed ions need not be too tightly bound within the cyclic polyether ring.

We have found that there are two critical requirements necessary for application of these crown cyclic polyethers to make useful reverse osmosis membranes or other type liquid purification materials. The crown ring diameter must be within a critical size range, so tht the ions in the applied liquid feed solution will be electrically trapped rather than pass through with the product purified liquid. The preferred starting material compounds are: benzo-[x-crown-y] where x must be between 9 to 18 and y must be between 3 to 6, dibenzo-[x-crown-y] where x must be between 12 to 30 and y must be between 4 to 10, cyclohexyl-[x-crown-y] where x must be between 9 to 18 and y must be between 3 to 6, dicyclohexyl [x-crown-y] where x must be between 12 to 30 and y must be between 4 to 10 and x-crown-y where x must be between 9 to 28 and y must be between 3 to 8. Divalent radicals of these compounds are the preferred constituents in the polymers of this invention. The second requirement is that the crown cyclic polyethers must contain nitrogen linkages in their polymer chain. The nitrogen linkage may be directly connected to a carbon atom in an unsubstituted crown polyether or to a carbon in the benzene or cyclohexane ring; or removed from a carbon atom in an unsubstituted crown polyether or removed from a carbon in the benzene or cyclohexane ring along the chain, for example, with dibenzo crown polyethers:

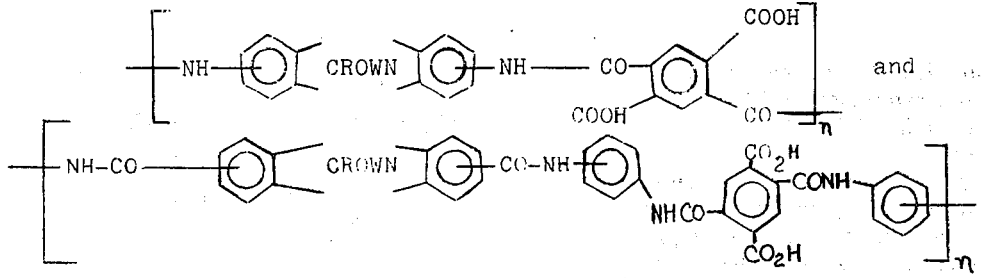

are both film forming hydrophilic polymers useful in this invention.

The nitrogen linkages make the crown cyclic polyether polymers very hydrophilic and are effective to help transport water molecules through the polymeric materials. Cyclic polyethers containing nitrogen linkages were found to be good film formers, so that membranes could be cast from a polymeric solution. Preferably the nitrogen containing backbone polymer will be a polyamic acid polymer, a polyimide polymer or a polyamide-imide polymer containing hydrophilic carboxylate ion groups and hydrophilic Na, K or Mg constituents within the incorporated crown component. Various effective aniontrapping groups can also be introduced into the cation-trapping crown polymer chain to make the materials even more effective in purifying water and other salt containing liquids. Generally the membranes will have a thickness between about 0.01 to 10 mils and a substantially uniform crosssection.

The syntheses of monomers and polymers containing these crown groups are illustrated below, where for convenience the crown radical:

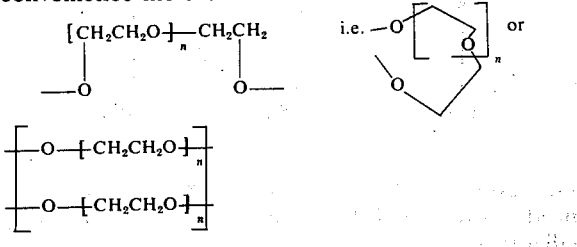

will be designated in the chemical structures as "crown"; although it is to be understood that the crown cyclic polyethers useful as the ion binding constituents in the nitrogen linked polymers of this invention are not limited to the structure where a —$C_2H_4$— group links the oxygen molecules i.e.

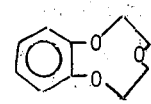

but may also include, for example —$C_6H_{12}$— or higher carbon chain groups linking the oxygen molecules i.e.

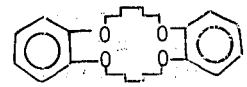

dibenzo-[20-crown-4],

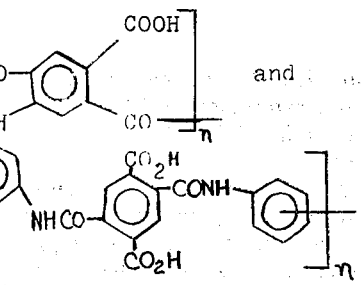

dibenzo-[28-crown-4] and unsymmetrical cyclic polyethers, such as, for example

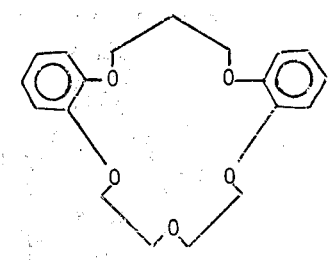

dibenzo-[16-crown-5]

In all cases, cyclohexyl rings or a divalent aliphatic or aromatic radical can replace the benzene ring.

Three reactions, A through C, are shown below and provide Compounds I through VI where n and m can range from about 5 to about 100. In these reactions dibenzo crown polyethers and certain specific isomers are used for illustrative purposes: (A) A crown polyamic acid polymer is formed by the reaction:

Any dianhydride containing two cyclic anhydride groups is suitable in the reactions (A) and (B) above. Dianhydrides known or contemplated to be particularly suitable are: 1,2,4,5-benzenetetracarboxylic dianhydride (PMDA), 3,4,3',4'-benzophenonetetracarboxylic dianhydride (BTDA), 2,3,6,7-naphthalene tet-

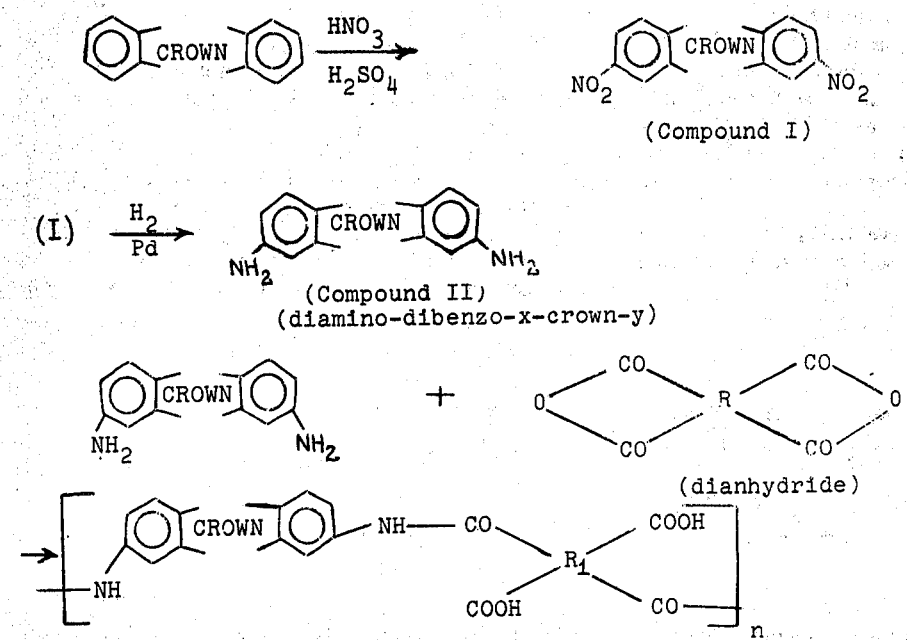

(Crown Polyamic Acid-Compound III) (B) A polyimide polymer is formed by the heat or chemical dehydration of Compound III:

racarboxylic dianhydride, 1,2,5,6-naphthalene tetracarboxylic dianhydride, 1,8,4,5-naphthalene tetracarboxylic dianydride, 3,4,3',4'-biphenyl tetracarboxylic

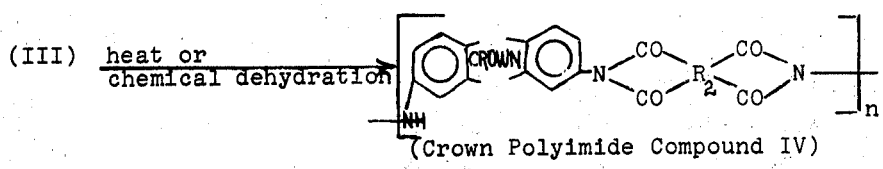

(C) A crown polyamide-imide polymer is formed by the reaction:

dianhydride, 2,3,2',3'-biphenyl tetracarboxylic dianhydride, bis-(3,4,-dicarboxyphenyl) methane dianhy-

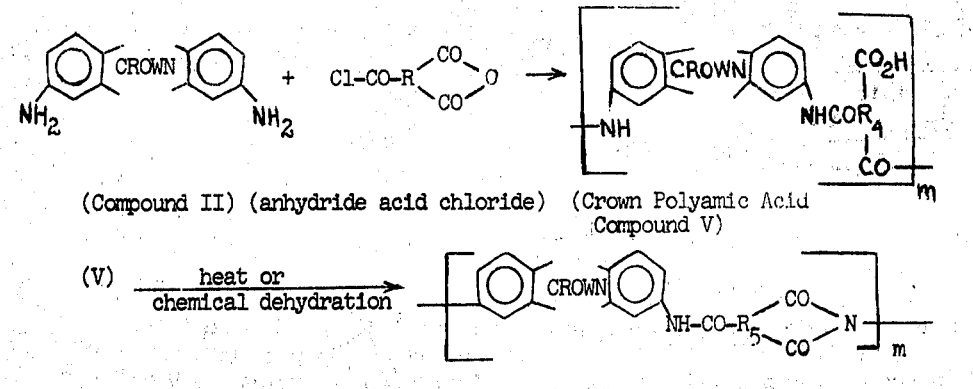

dride, 2,2,-bis-(3,4-dicarboxyphenyl) propane dianhydride, 1,2,3,4-cyclopentane tetracarboxylic dianhydride, tetrahydrofurane 2,3,4,5-tetracarboxylic dianhydride, 1,2,5,6-hexane tetracarboxylic dianhydride, bis-(3,4-dicarboxyphenyl) sulfone dianydride, bis-(3,4-dicarboxyphenyl) ether dianhydride, bicyclo (2,2,2)-octen-(7) 2,3,5,6 tetracarboxylic dianhydride and mellophanic dianhydride. Compounds containing three functional carbonyl groups are required to react with the crown compounds II in reaction (C). These compounds contain one cyclic anhydride group and one reactive carbonyl group such as an acyl halide, and include trimellitic anhydride-4-acid chloride, bicyclo-[2,2,2]-octene-(7)-2,3,5-tricarboxylic acid-2,3-anhydride-5-acid chloride and maleopimaric anhydride acid chloride.

In reactions (A) and (B) above, $R_1$ and $R_2$ are at least one tetravalent organic radical preferably selected from the group consisting of:

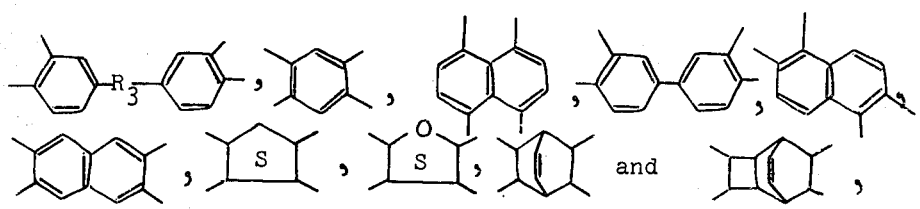

$R_3$ being selected from the group consisting of divalent aliphatic hydrocarbon radicals having from 1 to 4 carbon atoms and carbonyl, oxy, sulfo, and sulfonyl radicals and S indicates a saturated ring structure.

In reaction (C) above, $R_4$ and $R_5$ are at least one trivalent organic radical, preferably selected from the group consisting of:

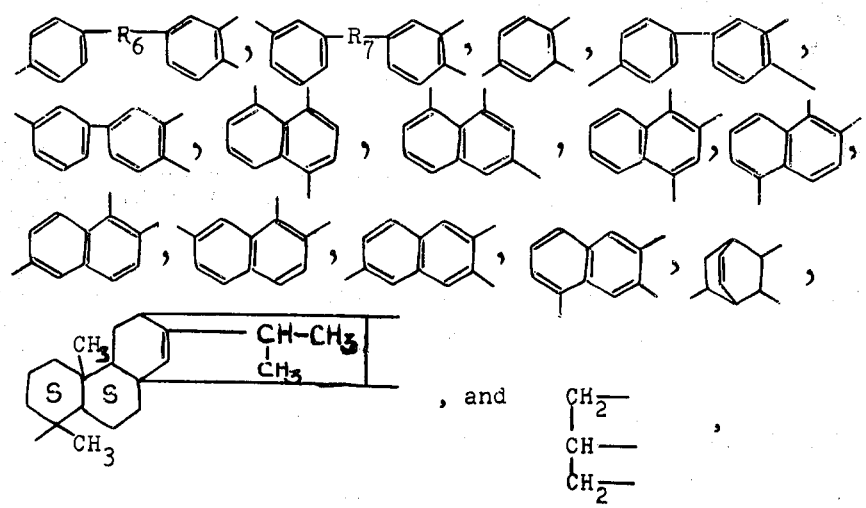

$R_6$ and $R_7$ being the same as $R_3$ described in the preceding paragraph.

Of these compounds, the crown polyamic acid polymers, crown polyimide polymers and crown polyamideimide polymers are preferred as providing excellent film forming characteristics and having large numbers of pendant hydrophilic carboxyl groups 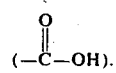

The nitrogen containing polyamide-imide and polyimide resins are described by Frost and Bower in "Aromatic Polyimides" J. Polymer Science, Part A, Vol. 1, 1963, 3135–3150 and U.S. Pat. Nos. 3,179,631; 3,179,632; 3,179,633 on polyimides and 3,179,635 on polyamide-imides, herein incorporated by reference. The other compounds are well known to those skilled in the art.

All of these nitrogen linked crown polymers formed by reactions (A) through (C) contain crown cyclic polyethers, as pendant sidegroups or as a part of the chain, capable of effectively complexing with ions in liquid salt solutions and are linked by chains containing nitrogen atoms. These nitrogen linked crown cyclic polyether polymers can be cast as a solvent solution to form flat or tubular films and membranes, suitable for use in reverse osmosis or other type liquid purification systems, or they can be made in the form of beads, granules or long strands for use in packed column type liquid purification systems. Salt ions will be immobilized in the polymeric membrane, bead or strand, but water will be able to pass through the system. As an illustration, polymers of Compound III formed by reaction (A) Compound IV formed by reaction B and the potassium salt of Compound V formed by reaction (C) were synthesized and cast as film membranes. Several of these membranes were tested in a reverse osmosis water purification system.

EXAMPLE I

Preparation of polyamic acid and polyimide crown cyclic polyether films: The compound 2,3,11,12-dibenzo-1,4,7,10,13,16-hexaoxacyclooctadeca-2,11-diene(-dibenzo-18-crown-6) was prepared by the method of C. J. Pedersen (J. Am. Chem. Soc., 89:7017 (1967): A slurry of 20 g. of this compound in 50 ml glacial acetic acid was added over a 30 minute period to a stirred mixture of 25 ml conc. nitric acid and 50 ml water at 4°-5°C. The mixture was stirred for an additional 15 minutes at 5°C and was allowed to warm to room temperature over a period of 1 hour. The product was filtered, and the solids were washed with water and dried at 75°C in vacuum to give 22.1 g. (88% yield) of crude dinitro compound as a tan powder. This material was extracted with 150 ml of hot chloroform in several portions. Evaporation of the chloroform solution gave 12.04 g. of solid, which was recrystallized from 100 ml of chloroform to give 1.27 g. of yellow powder. The remainder of the chloroform extract was essentially all recovered dibenzo-18-crown-6. Material insoluble in chloroform was recrystallized from 100 ml. of dimethylacetamide (DMAC) to give 4.32 g. of an off-white powder, m.p. 239°C, dinitro dibenzo-18-crown-6 (isomer A)

Anal. Caldc. for $C_{20}H_{22}N_2O_{10}$: C, 53.33; H, 4.93; N, 6.23; O, 35.52. Found: C, 53.80; 53.75; H, 4.68, 4.60; N, 5.90, 5,88; O, 35.50, 35.68.

Filtrate from the DMAC recrystallization was mixed with sufficient water to produce a slightly cloudy mixture. On standing for several hours, crystallization occurred. Solid product was filtered off, washed with water, and dried at 135°C in vacuum to give 1.23 g. of a yellow powder m.p. 190°C, dinitro dibenzo-18-crown-6 (isomer B).

Anal. Calcd. for $C_{20}H_{22}N_2O_{10}$: C, 53.33: H, 4.93; N, 6.23; O, 35.52. Found: C, 55.05, 54.92; H, 5.15, 5.13; N, 5.52, 5.53; O, 33.97, 34.13.

A mixture of 9.5 g. of the off-white powder, dinitro dibenzo-18-crown-6 (isomer A) and 200 ml. DMAC was hydrogenated with 0.5 g. of 5% Pd-on-C catalyst at 50 psi and 80°C. Catalyst was filtered off, and the filtrate was evaporated to 150 ml. in a stream of nitrogen. A precipitate formed, which was filtered off, washed with water, and dried at 110°C in vacuum to give 3.17 g. of silvery platelets. The filtrate was diluted to 300 ml. with water to give additional precipitate, which was filtered off, washed with water, and dried at 110°C to give 4.10 g. of a pink powder. The pink powder was dissolved in 400 ml. of 1% HC1. The solution was filtered and then stirred while adding $NH_4OH$ until a precipitate formed at pH 9. The precipitate was filtered off, washed with water, and dried 110°C in vacuum to give 3.66 g. of pink-white powder, m.p. 192° C. The silvery platelets were also dissolved in 1% HC1, precipitated with $NH_4OH$, washed and dried in the same way to give 2.80 g. of pale pink powder, m.p. 195°C, diamino-2,3,11,12-dibenzo1,4,7,10,13,16-hexaoxacyclooctadeca-2,11-diene, or diamino dibenzo-18-crown-6, having the same isomeric configuration as isomer A above. This compound has been previously identified as Compound II.

DMAC (12 ml) was added to a mixture of 1.9523 g. (.005 mole) of diamino dibenzo-18-crown-6 and 1.0907 g. (.005 mole) of pyromellitic dianhydride (PMDA). The mixture was stirred under nitrogen until a clear brown solution was obtained, 20% solids, viscosity z-4 to z-5 (Gardner). A sample of the solution was spread on a glass plate and evaporated for 90 minutes at 40°C in vacuum to give a tackfree polymeric film about 5 mils thick having a substantially uniform cross-section. Residual solvent was removed by leaching in water, and the film was removed from the glass plate. It was clear yellow, tough, flexible, and could be creased repeatedly without cracking. The polymer in this film was a polyamic acid having the following structure:

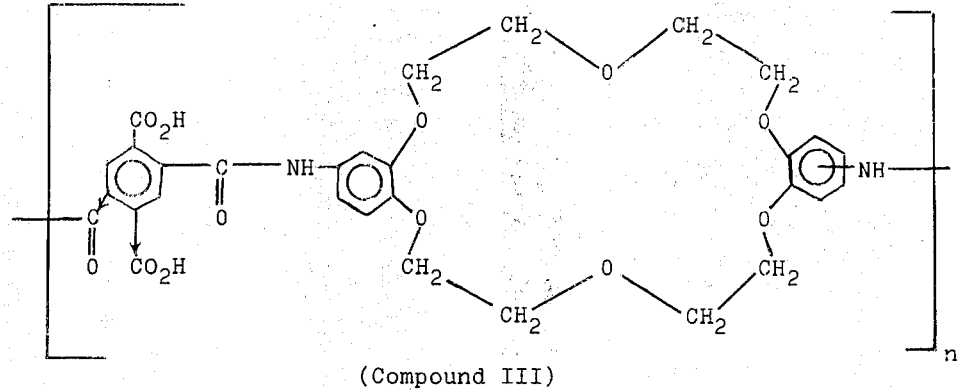

(Compound III)

This product is apparently contaminated with a small proportion of mono nitro compound.

Six different isomers are possible for dinitro dibenzo-18-crown-6 if we assume that one nitro group is attached to each of the benzene rings. Isomer A is believed to be one of the two p,p' isomers or one of the o,p' isomers. All of the dinitro compounds are useful in the invention. These compounds have been previously identified as Compound I.

in which arrows denote isomerism between the two positions involved. This compound has been previously identified as Compound III. A piece of the film was soaked for 30 minutes in a 50:50 mixture of acetic anhydride and pyridine, rinsed in benzene, and dried. The resulting chemically dehydrated film, about 1 mil in thickness, was very strong, tough, and flexible. This film was largely the crown polyimide form previously described in reaction (B):

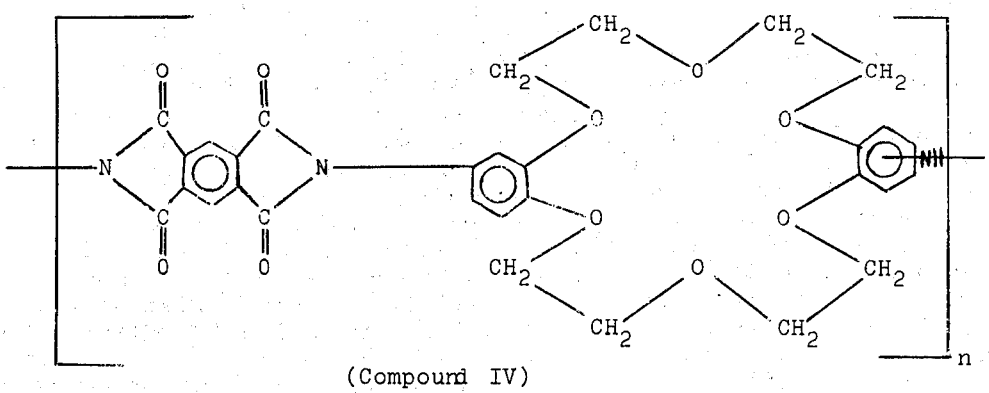

(Compound IV)

The crown polyimide polymer was also obtained by heating a sample of the polyamic film for 15 minutes at 200°C.

EXAMPLE 2

Preparation of polyamic acid and polyamide imide crown cyclic polyether films: DMAC (5 ml) was added to a mixture of 0.7809 g. (.002 mole) diaminodibenzo-18-crown-6, prepared according to Example 1, and 0.4211 g. (.002 mole) of trimellitic anhydride-4-acid chloride, and the mixture was stirred until the exothermic reaction subsided. It was heated to 60°C for 10 minutes to give a nearly clear solution, which then became a thick, opaque paste. Triethylamine (3 ml) was added and the mixture was poured into 100 ml of water. A clear brown solution was obtained, containing the triethylammonium salt of the amic acid form of the polymer:

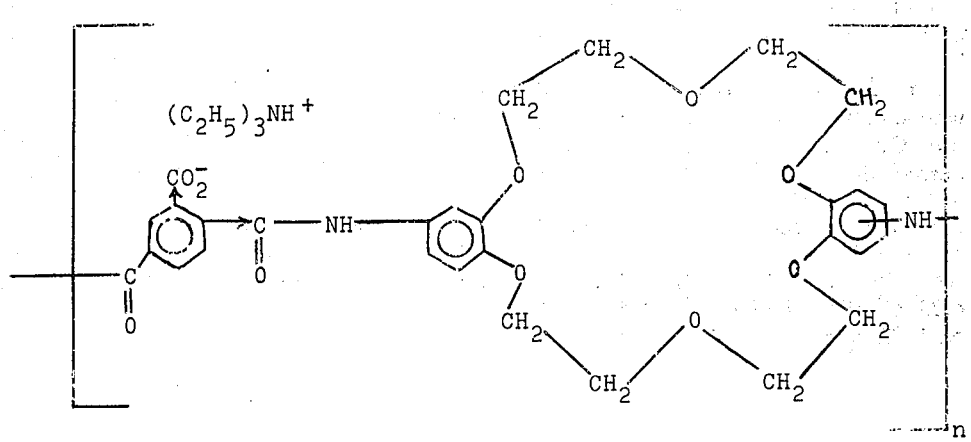

Concentrated HCl was added until a gelatinous precipitate formed at pH 2. It was filtered off, washed with water, and dried at a 60°C in vacuum to give 1.10 g. (97% yield) of solid resin, which was dissolved in 4.40 g. of DMAC to give a solution of the amic acid form of the polymer having the structure:

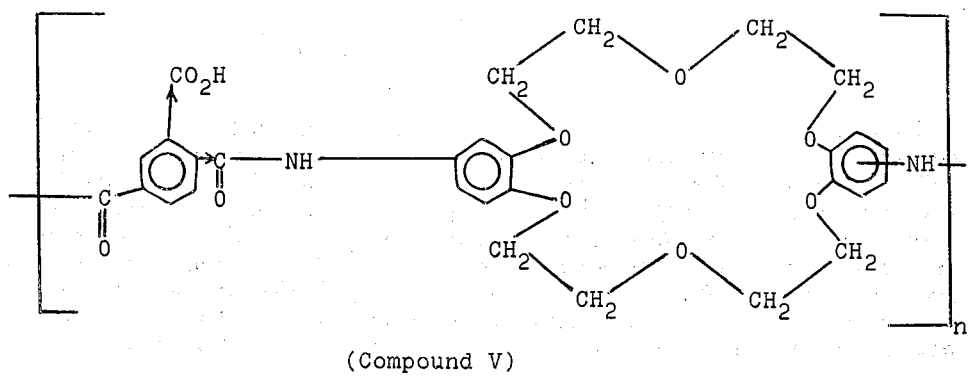

(Compound V)

in which arrows denote isomerism between the two positions involved. This compound has been previously identified as Compound V.

A film of the free crown polyamic acid was prepared by applying a sample of the solution on a glass plate for one hour at 30°C in vacuum, and leaching in water to remove solvent and remove the film from the glass. A clear yellow soft film about 5 mils thick having a substantially uniform crosssection was obtained.

A sample of this compound was baked for one hour in an aluminum dish at 150°C followed by 15 minutes at 200°C to give a clear yellow, flexible, adherent film of the amide-imide form of the polymer, having the following structure of the type previously described in reaction C:

This nitrogen linked polymer containing macrocyclic polyether rings has a high affinity for potassium ions, and is capable of trapping them as shown above. Similarly, Li, Ma, Mg, Ba, Ca and $NH_4$ polyamic acid salts of Compound V should form useful membranes. The ion probably diffuses in an out of the ring in a mobile equilibrium, but spends a disproportionately large fraction of its time within the ring, where it bonds loosely to the oxygen atoms.

EXAMPLE 3

Films of Compound III, the polyamic acid cyclic polyether prepared in EXAMPLE 1 were prepared by spreading a solution of the polyamic acid cyclic polyether on two glass plates, evaporating solvent under

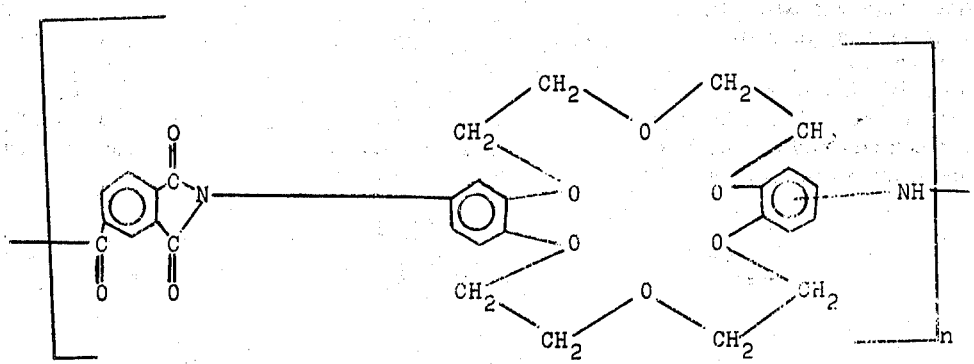

(Compound VI)

A glass plate coated with the polyamide-imide film was immersed in 0.5% KOH solution for 3 days, during which time the film floated free from the substrate. It was washed with water and dried between blotters to give a continuous flexible film. Thicker areas of the film were yellowbrown, and were shown by infrared analysis to be largely in the amide-imide form (absorption at 1775, 1718, 1388, and 724 $cm^{-1}$). Thinner portions of the film appeared colorless and were shown by differential infrared analysis to be largely in the form of the amic acid potassium salt (substantial absence of above bands; presence of carboxylate band at 1625 $cm^{-1}$; increased amide absorpotion at 1688 $cm^{-1}$). The structure of the amic acid potassium salt polymer i.e. the potassium salt of Compound V can be represented as:

vacuum for 24 hours, immersing the coated plates in water until the films floated free, cutting to 1 inch diameters and then laying the films down on discs of Millipore porous backing material. The film + Millipore composites were tested for reverse osmosis properties in a standard testing cell.

Films of the potassium salt of the polyamic acid polymer cyclic polyether prepared in EXAMPLE 2 were prepared by spreading a solution of the polyamic acid polymer cyclic polyether on a glass plate, which was then baked for 90 minutes at 200°C. It was cooled to room temperature and immersed in 3% KOH solution for 18 hours. The heating converts the amic acid group to an imide and the subsequent treatment with KOH converts the imide group to the potassium salt of the

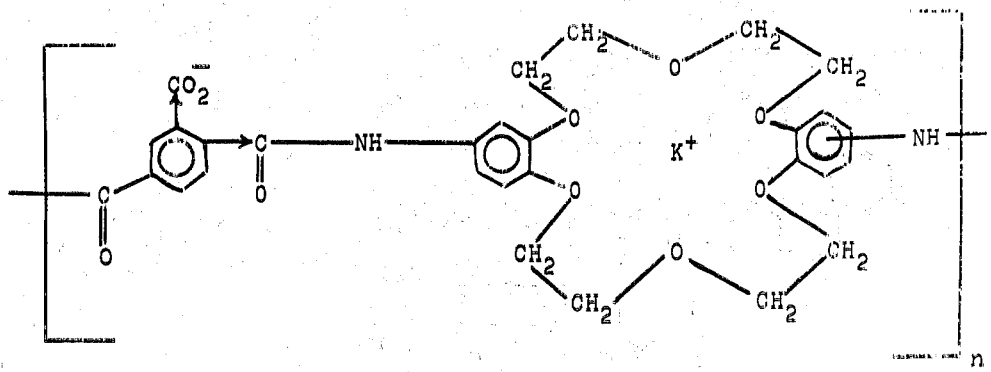

amic acid. The film, which was light reddish-brown, had floated free from its substrate. It was washed several times in water, cut to 1 inch diameter and then applied to Millipore substrates for reverse osmosis testing in a standard testing cell.

Results of reverse osmosis testing at 1500 psi with 3.5% NaCl solution for these membranes were as follows:

| Sample Film | Salt Rejection, % | Pure Water Flux, gal/ft²/day |
|---|---|---|
| Compound III | 46 | 3.5 |
| Potassium Salt of Compound V | 74 | 9.4 |

These membranes would be particularly useful in treating sewage by reverse osmosis or ultrafiltration. With certain other crown constitutents salt rejections of up to 99 percent could be expected.

The casting and testing equipment used in the examples consisted of a film sheet casting apparatus, a leaching bath and a test cell. The film membrane casting apparatus used consisted of a hollow container into which the casting solution was poured. One side of this container had a blade which adjusted the height of a hole extending along the length of the container. The casting solution flowed through the hole and onto the glass plate as the container was moved, to form the cast film. The leaching bath consisted of a tank where an ice water mixture was kept. The membrane cells used for testing flat membranes were of the standard type and used Type 304 stainless steel or plexiglass as construction materials. Round cells were used for testing 1.0 inch diameter membranes. In this cell the feed water side seal is made with a rubber "O" ring and the product side collection consisted of fine stainless steel wire cloth covered with two layers of paper contacting the cast membrane.

The salts of the crown polyamic acids and also the crown polyamic acids, provide membranes preferred over crown imide or crown polyamide membranes. The crown polyamic acid and crown polyamic acid salt membranes should have improved ion trapping ability over crown polyimide or crown polyamide imide membranes, due to the larger number of pendant carboxyl groups are more hydrophilic, and so allowing improved pure water flux over comparable crown polyimide or crown polyamide imide membranes.

I claim:
1. A polymeric membrane, useful for ultrafiltration and reverse osmosis, selected from the group consisting of polyamic acid linked crown cyclic polyethers and polyimide linked crown cyclic polyethers having the structure selected from the group consisting of:

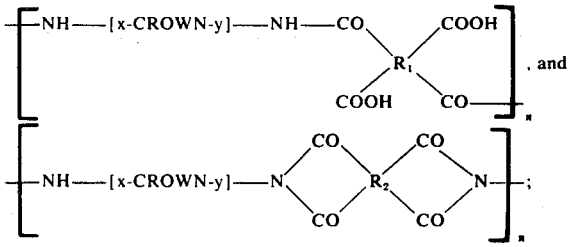

wherein $n$ has a value of from about 5-100, $R_1$ and $R_2$ are at least one tetravalent organic radical, selected from the group consisting of:

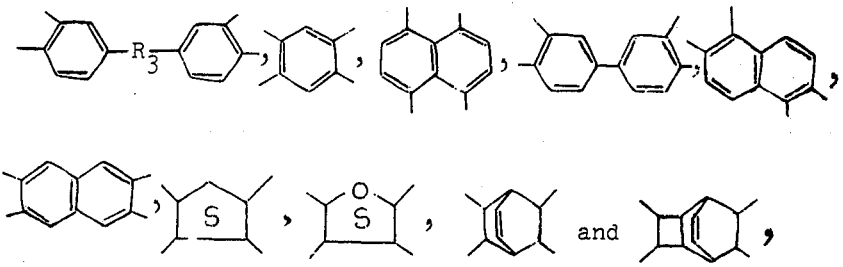

$R_3$ being selected from the group consisting of divalent aliphatic hydrocarbon radicals having from 1 to 4 carbon atoms and carbonyl, oxy, sulfo, and sulfonyl radicals; and

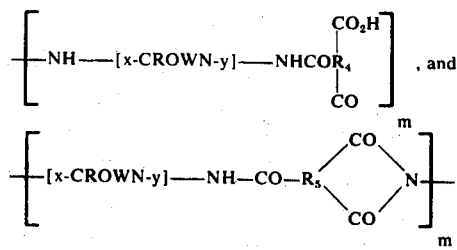

wherein $m$ has a value of from about 5-100, $R_4$ and $R_5$ are at least one trivalent organic radical, selected from the group consisting of:

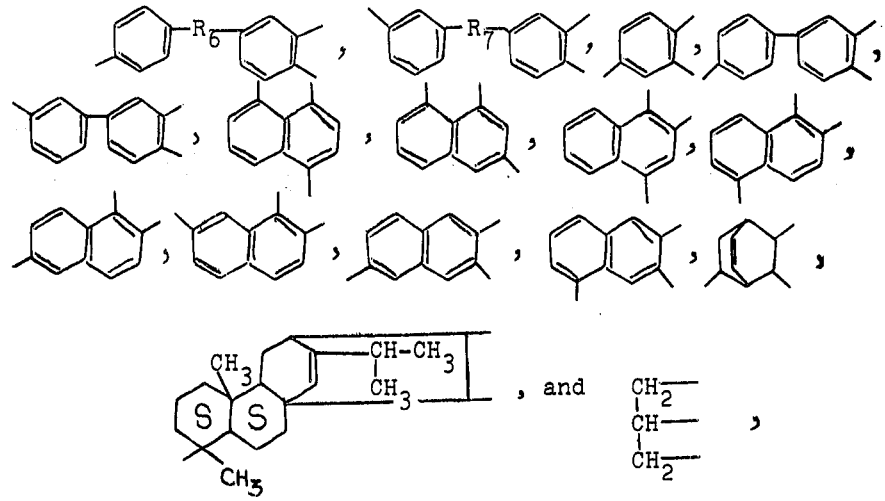

$R_6$ and $R_7$ being selected from the group consisting of divalent aliphatic hydrocarbon radicals having from 1 to 4 carbon atoms and carbonyl, oxy, sulfo, and sulfonyl radicals, and wherein the crown cyclic polyether constituent is an ion binding divalent radical represented as [x-CROWN-y], said crown cyclic polyether constituent being selected from the group consisting of 9-crown-3, 12-crown-4,15-crown-5, 18-crown-6, 21-crown-7,24-crown-8,dibenzo-12-crown-4, dibenzo 15-crown-5,dibenzo 18-crown-6,dibenzo-21-crown-7, dibenzo-24-crown-8,dibenzo-27-crown-9, dibenzo-30-crown-10, dicyclohexyl-12-crown-4,dicyclohexyl-15crown-5,dicyclohexyl-18-crown-6,dicyclohexyl-21-crown-7,dicyclohexyl-24-crown-8,dicyclohexyl-27-crown-9,dicyclohexyl-30-crown-10,benzo-9-crown-3,benzo-12-crown-4,benzo-15-crown-5,benzo-18-crown-6,cyclohexyl-9-crown-3,cyclohexyl-12-crown-4,cyclohexyl-15-crown-5 and cyclohexyl-18-crown-6 wherein $x$ is the total number of carbon plus oxygen atoms making up the polyether ring, and $y$ is the number of oxygen atoms on that ring and wherein the membrane is effective to electrically trap ions in applied contaminated liquid solutions.

2. The membrane of claim 1 wherein the crown polyether constituent being selected from the group consisting of dibenzo-15-crown-5,dibenzo-18-crown-6,dibenzo-21-crown-7,dicyclohexyl-15-crown-5,dicyclohexyl-18-crown-6, and dicyclohexyl-21-crown-7.

3. The membrane of claim 1, wherein the crown polyether constituent is selected from the group consisting of polyamic acid linked crown cyclic polyethers and salts thereof.

4. The membrane of claim 3, wherein the salts are selected from the group consisting of Na,K and Mg salts.

5. A membrane, useful for ultrafiltration and reverse osmosis, having a structure selected from the group consisting of:

wherein $n$ has a value of from about 5–100, $R_1$ and $R_2$ are at least one tetravalent organic radical, selected from the group consisting of:

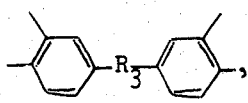

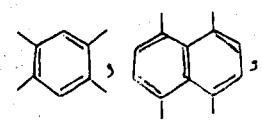

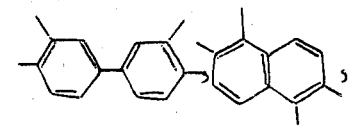

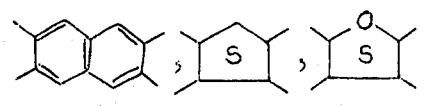

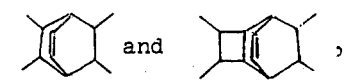

$R_3$ being selected from the group consisting of divalent aliphatic hydrocarbon radicals having from 1 to 4 carbon atoms and carbonyl, oxy, sulfo, and sulfonyl radicals; and

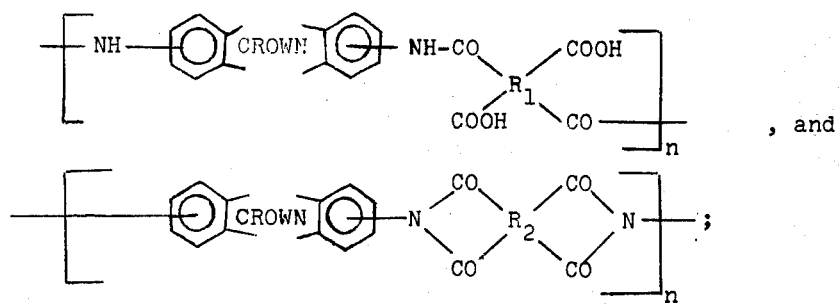

, and

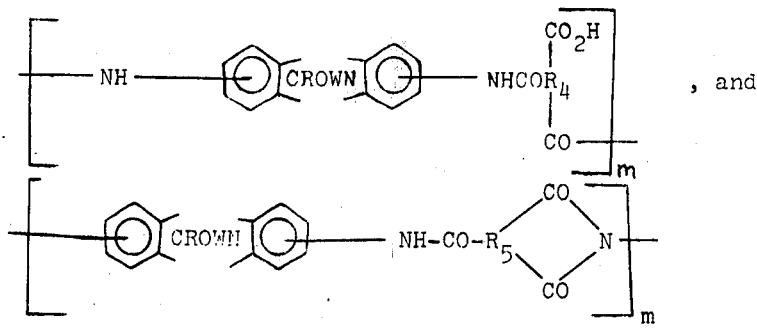

, and wherein $m$ has a value of from about 5-100, $R_4$ and $R_5$ are at least one trivalent organic radical, selected from the group consisting of:

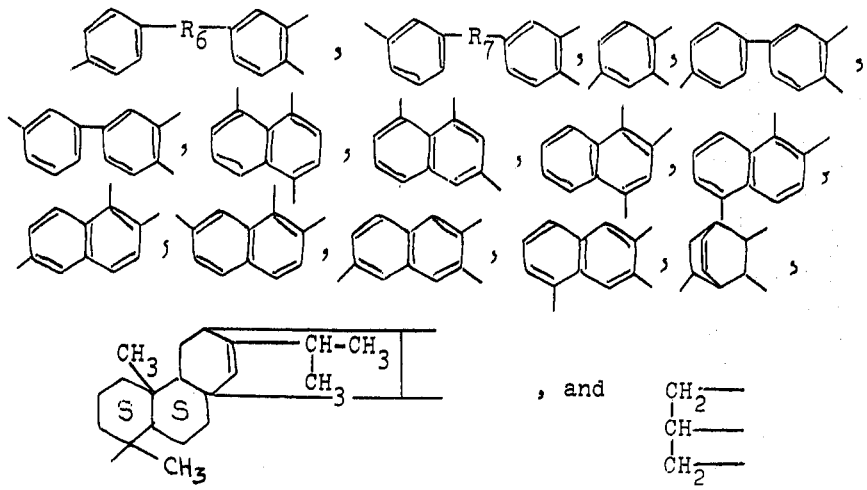

$R_6$ and $R_7$ being selected from the group consisting of divalent aliphatic hydrocarbon radicals having from 1 to 4 carbon atoms and carbonyl, oxy, sulfo, and sulfonyl radicals, and wherein the

constituents have a ring structure cntaining from 4-10 oxygen atoms which alternate with -$CH_2$-$CH_2$ radicals, and the total number of carbon atoms plus oxygen atoms in the ring is from 12-30.

6. The membrane of claim 5 having a structure selected from the group consisting of:

3

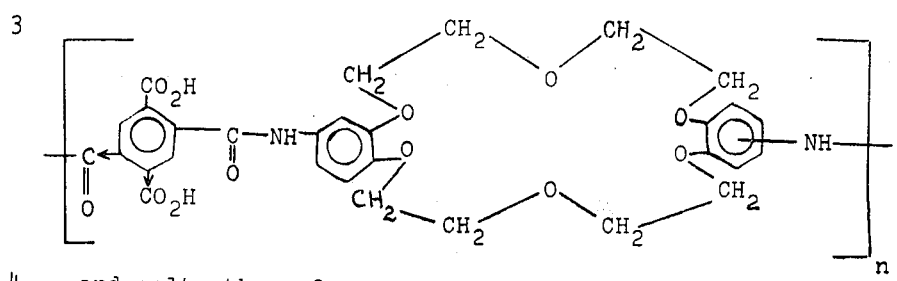

4 and salts thereof,

5

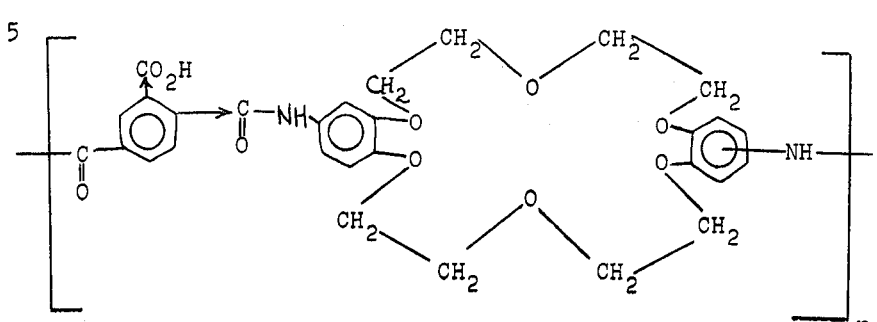

6 and salts thereof,

7

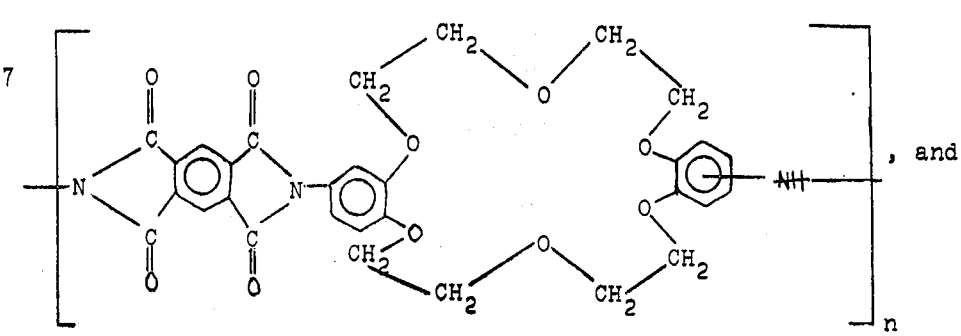

, and

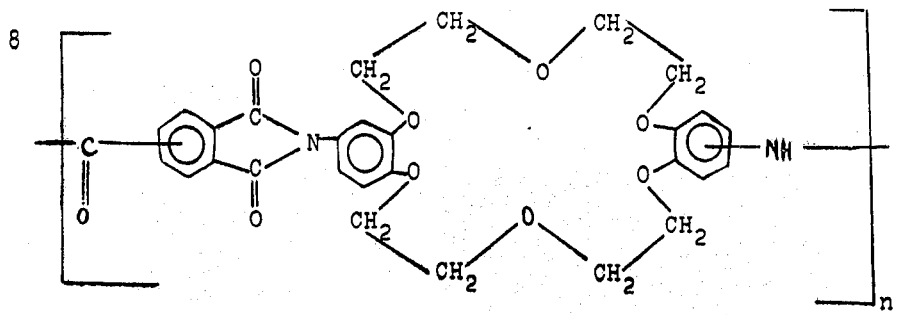

where $n$ is from about 5 to about 100.

7. The membrane of claim 6, supported within a porous support tube in a liquid treatment system, the support tube having a thickness between 0.01 to 10 mils and a substantially uniform cross-section.

8. The membrane of claim 6, wherein the salts are selected from the group consisting of Na, K and Mg salts.

9. A polymeric membrane, useful for ultrafiltration and reverse osmosis, selected from the group consisting of polyamic acid linked crown cyclic polyethers and polyimide linked crown cyclic polyethers, wherein said membrane consists essentially of nitrogen linked cyclic polyether ion binding divalent radical constituents, said cyclic polyether radicals having a ring structure of alternating oxygen atoms and organic radicals and being selected from the group consisting of benzo-[x-crown-y] where $x$ is 9 to 18 and $y$ is 3 to 6, dibenzo-[x-crown-y] where $x$ is 12 to 30 and $y$ is 4 to 10, cyclohexyl-[x-crown-y] where $x$ is 9 to 18 and $y$ is 3 to 6 and dicyclohexyl-[x-crown-y] where $x$ is 12 to 30 and $y$ is 4 to 10 and wherein $x$ is the total number of carbon plus oxygen atoms making up the polyether ring, and $y$ is the number of oxygen atoms in that ring, said membrane having a thickness between about 0.01 to 10 mils.

* * * * *